Figures 1, 2:
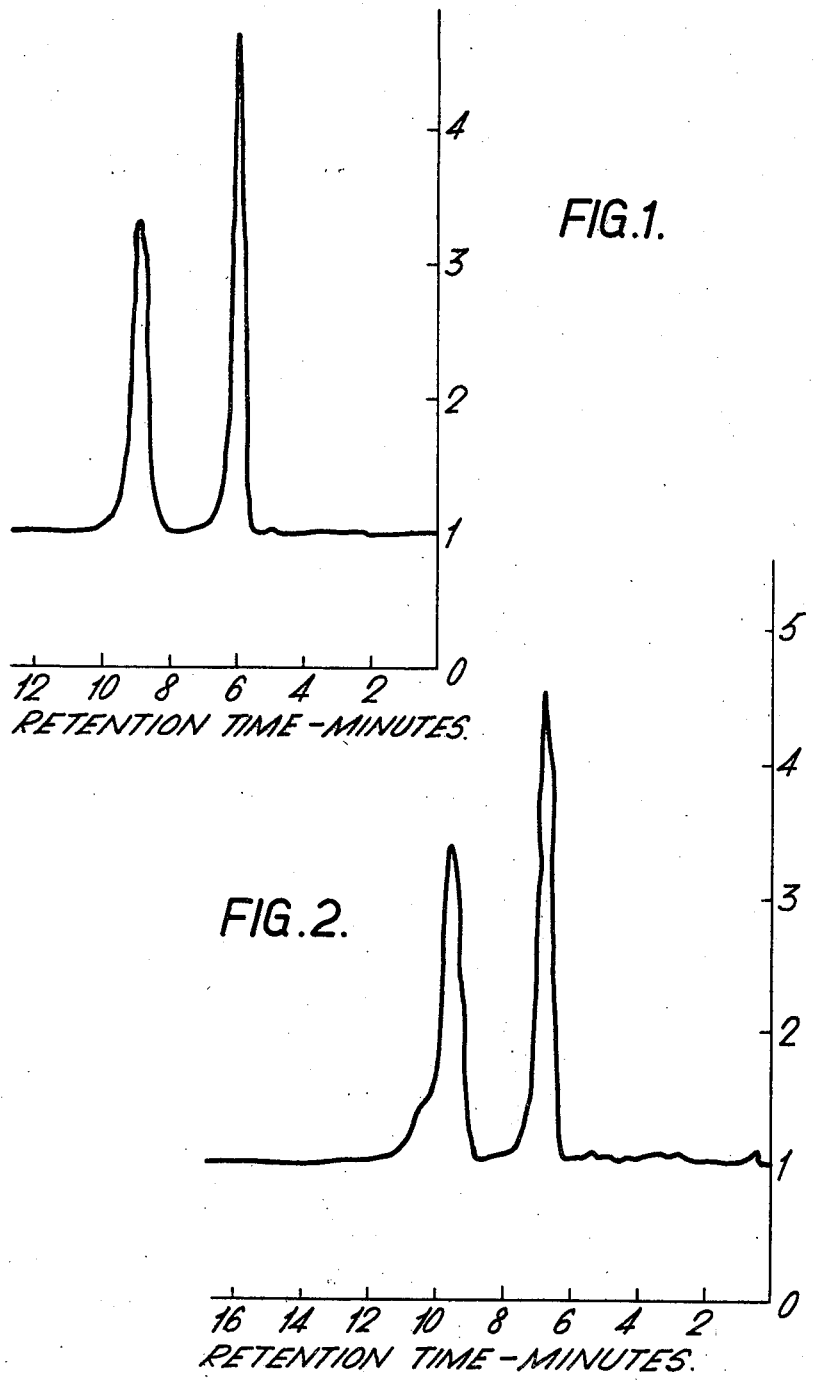

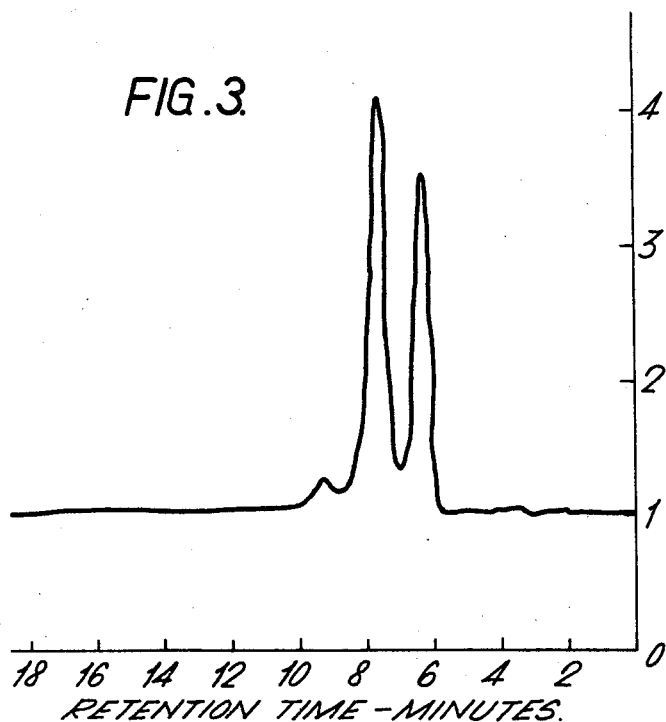
FIG. 3
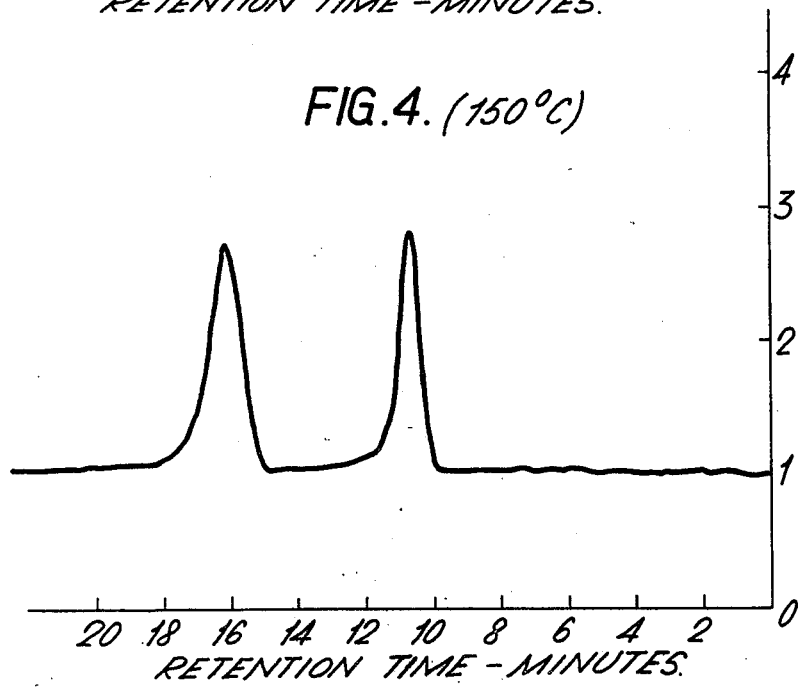
FIG. 4. (150°C)

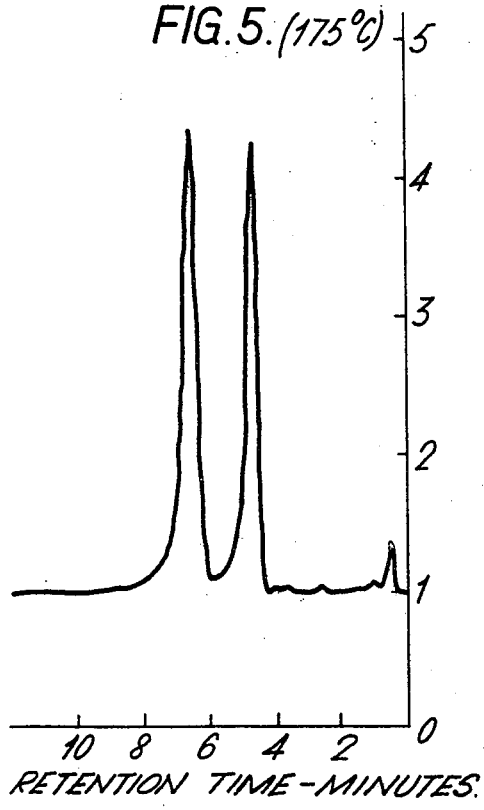
FIG. 5. (175°C)
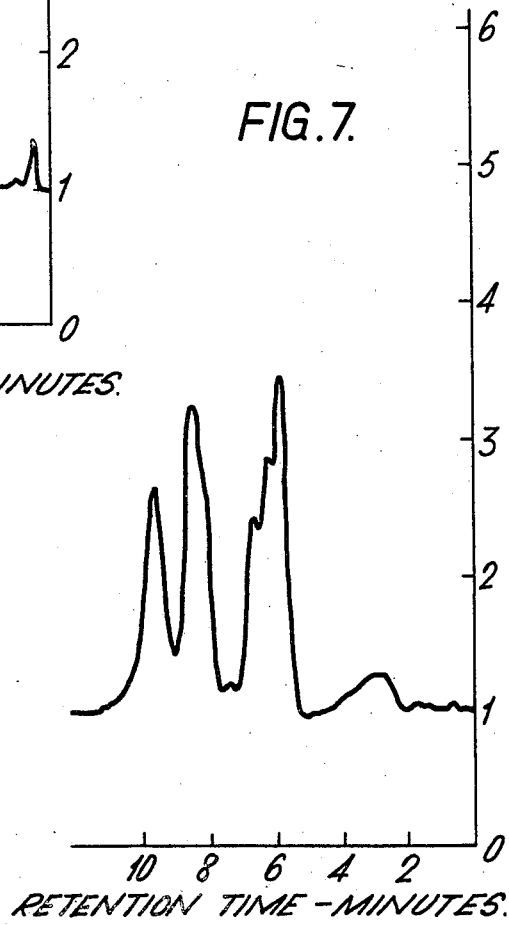
FIG. 7.

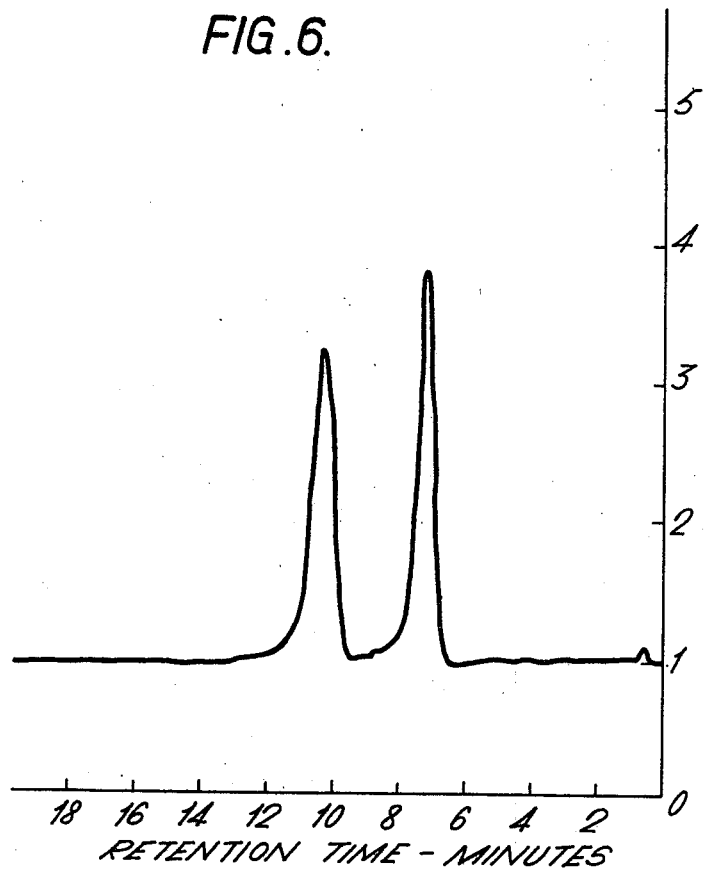

United States Patent Office 3,496,193
Patented Feb. 17, 1970

3,496,193
INDENO-[1,2-d]-m-DIOXIN DERIVATIVES
Basil Jason Heywood and Otto Meresz, Hornchurch, England, assignors to May & Baker Limited, Dagenham, Essex, England, a British company
Filed Aug. 28, 1968, Ser. No. 755,921
Claims priority, application Great Britain, Aug. 30, 1967, 39,734/67
Int. Cl. C07d *15/04;* C11b *9/00*
U.S. Cl. 260—340.3
9 Claims

ABSTRACT OF THE DISCLOSURE 2,4 - dialkyl - 4,4a,5,9b - tetrahydroindeno[1,2-d] - m-dioxin derivatives of the formula:

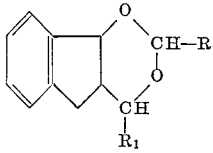

wherein R and $R_1$ represent methyl, ethyl, propyl, isopropyl or butyl, possess odours useful in perfumery.

---

This invention relates to new indeno[1,2-d]-m-dioxin derivatives, their process of preparation, their use in perfumery and compositions containing them.

As a result of research and experimentation, it has been found that a new class of indeno[1,2-d]-m-dioxin derivatives possess odours which render them of value in perfumery.

According to the present invention, there are provided the 2,4 - dialkyl-4,4a,5,9b-tetrahydroindeno[1,2-d)-m- dioxin derivatives of the general formula:

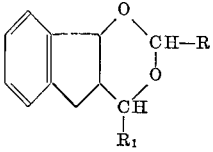

wherein R and $R_1$ are the same or different and each represents a methyl, ethyl, propyl, isopropyl or butyl group. Preferably R and $R_1$ are the same, the compound wherein they both represent methyl, i.e. 2,4-dimethyl-4,4a,5,9b-tetrahydroindeno[1,2-d] - m - dioxin, being of particular value in perfumery.

According to a feature of the present invention, the compounds of Formula I are prepared by the reaction of indene with:

(a) when the groups represented by R and $R_1$ are the same, an aldehyde of the formula RCHO (wherein R is as hereinbefore defined) or (b) when the groups represented by R and $R_1$ are different, and equimolecular mixture of aldehyde of the formulae RCHO and $R_1$CHO, wherein R and $R_1$ are as hereinbefore defined.

The reaction is carried out in the presence of formic acid, which serves as a solvent for the reactants and as a catalyst for the reaction. If desired, the reaction mixture may also contain one or more of an inert organic solvent (e.g. petroleum ether, an antioxidant (e.g. hydroquinone) and an acid catalyst (e.g. perchloric acid). The reaction is preferably carried out at ambient temperature.

The compounds of Formula I may exist in geometrically isomeric forms and the present invention includes such isomers within its scope.

The following examples illustrate the preparation of the new compounds of the present invention. FIGURES 1 to 7 of the accompanying drawings give gas-liquid chromatograms of the products obtained by the procedures of the examples. Gas-liquid chromatography data were obtained using a 1% diethylene glycol succinate stationary phase on Chromosorb G 70–80 mesh support in a column of length 1829 mm. and internal diameter 4 mm., the inlet pressure of the carrier gas being 10 p.s.i.

EXAMPLE I

A heterogeneous mixture of 90% formic acid (400 ml.), acetaldehyde (280 ml.), petroleum ether (B.P. 60°–80° C.; 650 ml.), indene (232 ml.) and hydroquinone (0.75 g.) was treated with solid carbon dioxide to flush out air and stirred at room temperature for 3 days. The reaction mixture was then diluted with water (1 litre) and the organic layer separated and washed successively with water, saturated aqueous sodium bicarbonate solution, and water. After drying over magnesium sulphate and evaporation of the solvent, the product was distilled under high vacuum and the fraction B.P. 63°–67° C./0.05 mm. Hg (112.8 g.) collected and redistilled to give 2,4 - dimethyl - 4,4a,5,9b - tetrahydroindeno[1,2-d] - m-dioxin (79.4 g.), B.P. 64°–65° C./0.05 mm. Hg, which possessed a rose odour similar to that of Rose Damascena. Gas-liquid chromatography at 150° C. showed it to be a mixture of two components corresponding to geometric isomers in the ratio 1.8:1, richer in the more volatile component, as shown by the chromatogram (FIGURE 1).

EXAMPLE II

Indene (116 ml.), propionaldehyde (200 ml.), 90% formic acid (160 ml.) and petroleum ether (B.P. 40°–60° C.; 200 ml.) were mixed and stirred vigorously at room temperature for 72 hours. The mixture was diluted with water (1 litre).

The organic layer was separated and washed successively with water, saturated aqueous sodium bicarbonate solution, and water. After drying over anhydrous sodium sulphate and evaporation of the solvent, the product was distilled under high vacuum to give 2,4-diethyl-4,4a-5,9b-tetrahydroindeno[1,2-d]-m-dioxin (38.5 g.) B.P. 94°–98° C./0.065 mm. Hg, which possessed a light, fresh, woody odour with floral overtones. Gas-liquid chromatography at 150° C. indicated the presence of two components corresponding to geometric isomers in approximately equal proportions, as shown by the chromatogram (FIGURE 2).

EXAMPLE III

A heterogeneous mixture of isobutyraldehyde (110 ml.), 90% formic acid (160 ml.), petroleum ether (B.P. 60°–80° C.; 100 ml.) and indene (58 ml.) was stirred at room temperature for 60 hours. The reaction mixture was then diluted with water (500 ml.) and the organic layer was washed successively with water, saturated sodium bicarbonate solution and water. After drying over magnesium sulphate and evaporation of the solvent, the product was distilled and the fraction boiling at 95–112° C./0.05 mm. Hg (21.3 g.) was collected and redistilled to give 2,4-diisopropyl-4,4a,5,9b-tetrahydroindeno[1,2-d]-m-dioxin (11.6 g.), B.P. 112–114° C./0.05 mm. Hg, which possessed a strong odour, having a woody note with the full richness of oil of sandalwood and a top note similar to that of oil of verbena (*Lippia citriodora* Dist.). Gas-liquid chromatography at 150° C. showed it to be a mixture of two components corresponding to geometric isomers in the ratio of 1.55:1, richer in the less volatile component, as shown by the chromatogram (FIGURE 3).

EXAMPLE IV

A heterogeneous mixture of 90% formic acid (160 ml.), butyraldehyde (265 ml.), petroleum ether (B.P. 60–80° C.; 200 ml.), indene (116 ml.), hydroquinone (0.5 g.) and 70% aqueous perchloric acid (4 drops) was stirred at room temperature for 2 days and then at 40° C. for a further day. The reaction mixture was then diluted with water (1 litre) and the organic layer was separated and washed successively with water, saturated aqueous sodium bicarbonate solution and water. After drying over magnesium sulphate and evaporation of the solvent, the product was distilled and the fraction boiling at 110–145° C./0.08 mm. Hg (158 g.) was collected and redistilled to give 2,4-dipropyl-4,4a,5,9b-tetrahydroindeno[1,2-d]-m-dioxin (130 g.), B.P. 113–119° C./0.03 mm. Hg, which had a full-bodied fragrance very similar to the characteristic note of oil of sandalwood and having a background possessing a quality similar to the velvet note of a deep red rose.

Gas-liquid chromatography at 150° C. and at 175° C. showed it to be a mixture of two components corresponding to geometric isomers in the ratio 1:1, as shown by the chromatograms (FIGURES 4 and 5).

EXAMPLE V

A heterogeneous mixtures of 90% formic acid (160 ml.), pentanol (315 ml.), petroleum ether (B.P. 60–80° C.; 200 ml.), indene (116 ml.), hydroquinone (0.5 g) and 70% perchloric acid (4 drops) was stirred at room temperature for 1 day, then at 45° C. for 18 hours. The reaction mixture was then diluted with water (1 litre) and the organic layer was separated and washed successively with water, saturated aqueous sodium bicarbonate solution and water. After drying over magnesium sulphate and evaporation of the solvent, the product was distilled and the fraction boiling at 129°–165° C./0.04 mm. Hg (148 g.) was collected and redistilled to give 2,4-dibutyl-4,4a,5,9b-tetrahydroindeno[1,2-4] - m - dioxin (90.3 g.), B.P. 153°–155° C./0.09 mm. Hg, which possessed a rich, slightly fatty note with that dry sweetness associated with Ambergris. Gas-liquid chromatograph at 175° C. showed it to be a mixture of two components corresponding to geometric isomers in the ratio 1:1, as shown by the chromatogram (FIGURE 6).

EXAMPLE VI

A heterogeneous mixture of 90% formic acid (80 ml.), acetaldehyde (42 ml.), propionaldehyde (54 ml.), petroleum ether (B.P. 60°–80° C.; 100 ml.), indene (58 ml.), hydroquinone (0.2 g.) and 70% perchloric acid (2 drops) was stirred at room temperature for 2 days. The reaction mixture was then diluted wtih water (1 litre) and the organic layer was separated and washed successively with water, saturated aqueous sodium bicarbonate solution and water. After drying over magnesium sulphate and evaporation of the solvent, the product was distilled and the fraction boiling at 70°–84° C./0.05 mm. Hg (49.6 g.) was collected. This fraction possessed a strident floral chord similar to the natural floral tones of the more exotic flowers such as magnolia and a background and undertones possessing the sweet fragrance of honeysuckle ("Lonicera"). Gas-liquid chromatography showed it to be a mixture of six components in approximately equal amounts, two of which corresponded to the two geometric isomers of the product of Example I, two of which corresponded to the two geometric isomers of the product of Example II and the remaining two of which represent 2-ethyl-4-methyl - 4,4a,5,9b - tetrahydroindano[1,2-d]-m-dioxin and 4-ethyl-2-methyl-4,4a,5,9b-tetrahydroindeno-[1,2-d]-m-dioxin.

The chromatogram is shown in FIGURE 7.

As indicated above, the compounds of general Formula I possess odours which render them useful in perfumery.

As is well known, nearly all perfumes, including perfumes used in toilet articles such as soaps, hand creams, bath salts, talcum powders and hair lacquers, and also aerosols, and air fresheners, are mixtures of separately prepared odiferous principles, many of which are synthetically prepared chemical compounds rather than substances isolated from naturally occurring scented materials. In such mixtures of odiferous principles, known as compound perfume bases, each odiferous principle contributes a distinct "note" to the final composition, and the perfumer therefore needs to have at his disposal a wide range of odiferous principles, each of which can be used to impart a particular note to the final composition, in order to obtain the overall odour effect desired.

The present invention accordingly provides a compound perfume base comprising a plurality of odiferous principles, one of which is a 2,4-dialkyl-4,4a,5,9b-tetrahydroindeno[1,2-d]-m-dioxin derivative of general Formula I. Such compound perfume bases may be made in conventional manner by mixing the odiferous principles, and may include conventional perfume fixatives, such as coumarin, gum benzoin, and benzophenone, and diluents such as diethyl phthalate, benzyl alcohol and benzyl benzoate.

In such compound perfume bases the 2,4-dialkyl-4,4a,5,9b-tetrahydroindeno[1,2-d]-m-dioxin derivative of general Formula I ordinarily makes up 0.25% to 40% by weight of the total odiferous materials, but higher or lower concentrations may be used if desired. The compound perfume bases of the invention are especially useful for perfuming articles of toilet utility, e.g. those mentioned above.

Compounds of Formula I which are of particular value are 2,4 - diethyl - 4,4a,5,9b - tetrahydroindeno[1,2-d]-m-dioxin, which, as indicated in Example I, possesses a rose odour similar to that of Rose Damascena. Heretofore, it has proved very difficult to reproduce a natural rose odour without the use of the expensive natural product, and 2,4 - dimethyl-4,4a,5,9b-tetrahydroindeno[1,2-d]-m-dioxin is of particular value, since it may be used in varying proportions with the natural product with considerable advantage in cost and no disadvantage in odour. It may also be used alone, without the natural product, where the natural rose note is required in compound perfume bases.

Examples of compound perfume bases are as follows. Parts are by weight, and where a solution is mentioned, this is to be understood to mean a solution in an odourless solvent commonly used in the art, e.g. diethyl phthalate, or benzyl alcohol.

EXAMPLE VII

| | Parts |
|---|---|
| 2-phenylethyl alcohol | 53.50 |
| Rhodinol | 30.00 |
| Geraniol | 5.00 |
| 2-phenylethyl propionate | 0.50 |
| Aldehyde C9 | 0.10 |
| Linalol ex Bois de Rose Oil | 0.20 |
| Methyl ionone | 3.00 |
| Rose absolute 10% solution | 1.00 |
| Eugenol | 1.00 |
| Mimosa Concrete | 1.50 |
| 2,4-dimethyl-4,4a,5,9b-tetrahydroindeno[1,2-]-m-dioxin | 1.50 |
| Phenylacetic acid | 1.20 |
| 2-phenylethyl phenylacetate | 1.50 |
| | 100.0 |

EXAMPLE VIII

| | Parts |
|---|---|
| Musk ketone | 5.00 |
| Methyl naphthyl ketone | 5.00 |
| Nerantine | 3.00 |
| Geraniol ex Java Citronella Oil | 7.00 |

EXAMPLE VIII—Continued

| | Parts |
|---|---|
| Linalol ex Bois de Rose Oil | 10.00 |
| 2-phenylethyl alcohol | 8.00 |
| Terpineol Extra | 8.00 |
| Oil Petitgrain terpeneless | 12.00 |
| Oil Neroli Bigarade | 2.50 |
| Oil Ylang Ylang grade extra | 3.00 |
| Oil Boise de Rose Brazilian | 6.00 |
| Amyl cinnamic aldehyde | 1.00 |
| Anisaldehyde ex Anethole | 0.20 |
| Aldehyde C10 (10% solution) | 3.50 |
| Cyclamen aldehyde | 3.50 |
| Aldehyde Complex AD | 0.50 |
| Linalyl acetate ex Bois de Rose Oil | 2.50 |
| Benzyl propionate | 2.75 |
| Jasmin complex | 3.25 |
| Red Rose complex | 3.50 |
| 2,4 - diethyl-4,4a,5,9b-tetrahydroindeno[1,2-d]-m-dioxin | 10.00 |
| Lorena (trademark) | 4.50 |
| Diethyl phthalate (perfumery) | 7.30 |

EXAMPLE IX

| | Parts |
|---|---|
| 2-phenylethyl alcohol | 53.00 |
| Rhodinol | 30.00 |
| Rhodinyl acetate | 0.50 |
| Geraniol | 5.00 |
| 2-phenylethyl propionate | 0.50 |
| Aldehyde C9 | 0.10 |
| Linalol ex Bois de Rose Oil | 0.20 |
| Methyl ionone | 3.00 |
| Rose Absolute 10% solution | 1.00 |
| Eugenol | 1.00 |
| Mimosa Concrete | 1.50 |
| 2,4-dimethyl-4,4a,5,9b-tetrahydroindeno[1,2-d]-m-dioxin | 1.50 |
| Phenylacetic acid | 1.20 |
| 2-phenylethyl phenylacetate | 1.50 |
| | 100.0 |

We claim:

1. A compound of the formula:

wherein R and R₁ represent methyl, ethyl, propyl, isopropyl or butyl.

2. A compound according to claim 1 wherein R and R₁ represent the same alkyl group.

3. The compound according to claim 1 which is 2,4-dimethyl-4,4a,5,9b-tetrahydroindeno[1,2-d]-m-dioxin.

4. The compound according to claim 1 which is 2,4-diethyl-4,4a,5,9b-tetrahydroindeno[1,2-d]-m-dioxin.

5. The compound according to claim 1 which is 2,4-diisopropyl-4,4a,5,9b-tetrahydroindeno[1,2-d]-m-dioxin.

6. The compound according to claim 1 which is 2,4-dipropyl-4,4a,5,9b-tetrahydroindeno[1,2-d]-m-dioxin.

7. The compound according to claim 1 which is 2,4-dibutyl-4,4a,5,9b-tetrahydroindeno[1,2-d]-m-dioxin.

8. The compound according to claim 1 which is 2-ethyl-4-methyl-4,4a,5,9b-tetrahydroindeno[1,2-d]-m-dioxin.

9. The compound according to claim 1 which is 4-ethyl-2-methyl-4,4a,5,9b-tetrahydroindeno[1,2-d]-m-dioxin.

References Cited

UNITED STATES PATENTS 2,417,548   3/1947   Engel _____ 260—340.3

OTHER REFERENCES

Smissman et al.: Journal of Organic Chemistry, vol. 30(3), 1965, pp. 797–801.

Chemical Abstracts, Subject Index, Hy-Ly, vols. 41–50, 1947–56, p. 6541s, col. 3.

ALEX MAZEL, Primary Examiner

J. H. TURNIPSEED, Assistant Examiner

U.S. Cl. X.R.

252—522; 424—47, 76, 278